(12) United States Patent
Ferlitsch

(10) Patent No.: US 6,943,905 B2
(45) Date of Patent: Sep. 13, 2005

(54) VIRTUAL PRINT DRIVER SYSTEM AND METHOD

(75) Inventor: Andrew Rodney Ferlitsch, Tigard (CA)

(73) Assignee: Sharp Laboratories of America, Inc., Camus, WA (US)

(*) Notice: Subject to any disclaimer, the term of this patent is extended or adjusted under 35 U.S.C. 154(b) by 660 days.

(21) Appl. No.: 10/026,868

(22) Filed: Dec. 20, 2001

(65) Prior Publication Data

US 2003/0117638 A1 Jun. 26, 2003

(51) Int. Cl.[7] .................................................. G06F 15/00
(52) U.S. Cl. ..................................... 358/1.13; 358/1.15
(58) Field of Search .......................... 358/1.1, 1.5, 1.9, 358/1.11, 1.12, 1.13, 1.14, 1.15; 399/8, 9

(56) References Cited

U.S. PATENT DOCUMENTS

| | | | |
|---|---|---|---|
| 5,995,721 A | 11/1999 | Rourke et al. ............. | 395/114 |
| 6,088,120 A | 7/2000 | Shibusawa et al. ......... | 358/1.15 |
| 6,151,134 A * | 11/2000 | Deppa et al. ............... | 358/1.15 |

FOREIGN PATENT DOCUMENTS

JP   2001202214   1/2000   ............. G06F/3/12

* cited by examiner

*Primary Examiner*—Mark Wallerson
(74) *Attorney, Agent, or Firm*—Kirton & McConkie; Michael F. Krieger

(57) ABSTRACT

A computer-based printing system, comprised a client computing device, optionally one or more server computing devices, a virtual printer driver, one or more printer drivers, a print processor, print spooler, and one or more printers, means for initiating a print job(s), all or in part, or one or more copies of a document(s), in a local, network or remote, single or multi-user, printing environment, and a means to select the best fit printer based on printer capabilities, print quality and printer availability, without manually enumeration of each printer driver and printer status monitor.

45 Claims, 7 Drawing Sheets

VIRTUAL PRINT DRIVER SYSTEM AND METHOD

BACKGROUND OF THE INVENTION

1. Field of the Invention

The present invention relates to a multiple printer and associated print environment contained within a local, networked, or remote computing environment. Specifically, the present invention relates to a computer-based printing system having the ability to match a print job contained on one or more printing sources to the "best-fit" printing device contained within a set of available printing devices, wherein the "best-fit" is based on a set of identified criteria.

2. Background and Related Art

With the emergence of software and hardware components of computer systems, users are able to employ the systems to perform a variety of tasks. For example, a user may utilize a software application, such as a word processing, spreadsheet, or other application, to create a file or document. Once created, the document may be printed on a local, network or remote printer device.

In a computer system that includes simply a client computing device and a printing device, such as a printer, printing is significantly less complicated than printing within a networked environment.

FIG. 3 is a general depiction of a traditional client-based printing system, wherein all print jobs are directed to a local or remote printing device. In this basic setup, the User is unconcerned with selecting from a plurality of printers or printing devices because the system simply has only one printer accessible from client computing device. Upon selecting the Print command from an application or background process on the client computing device, the print job is automatically directed to the only printer attached to the system. Printer characteristics, such as speed, quality, etc. do not matter as no other available options for printing exist.

Specifically, FIG. 3 features a traditional print system comprising a client computing device 84 capable of supporting and running an application program 88 or a background process (not shown) from which a user may initiate a print job. The client computing device has contained thereon a print driver 92, a spooling device 96, a print processor 100, and a port manager 104. Once a print job is initiated, it is sent to the print driver 92, which then despools the data to the spooling device 96. Spooling device 96 subsequently despools the print data to printing device 134 through the appropriate port as directed and controlled by port manager 104. Optionally, a print processor 100 may be used to process the print job and send the appropriate print data to printing device 134.

In a computer system that includes various client computer devices and a printer device connected over a network, the utilization of the networked system to print a file or document traditionally includes the use of print queues on a centralized computing device that is commonly referred to as a print server. A print queue lines up print jobs for a particular network printer device. Thus, for example, when a number of documents are to be printed by a network printer, the documents are ordered in a print queue on the print server and pulled one at a time off the queue for printing. Print jobs are commonly executed in the same order that they were placed on the print queue, but may be prioritized based on other criteria, such as by the size or type of the documents to be printed.

When a user initiates a print command at one of the client computer devices, the client de-spools print data for the print job to a print queue that is associated with a corresponding network printer. The print queue is located on a print server. When it is time to remove the print job from the queue, the print server de-spools the print data from the print queue to the network printer. While this method for network printing enables a variety of client computer devices to utilize a network printer device, the method requires a large amount of network traffic since the print data must be de-spooled twice over the network, once to the printer server from the printing source, and once to the printing device(s) from the printer server. Furthermore, the traditional method causes a loss of bi-directional communication, resulting in a loss of error handling and/or a loss of job completion notices. Moreover, the traditional method requires the use of an additional computer device (the print server), which causes an increase in hardware costs and maintenance.

FIG. 4 is a general depiction of a client/server-based printing system, wherein all print jobs are directed to a printing device contained on a network. This setup represents a more complicated layout than the one previously described, as one or a plurality of printers may be accessible from one or more client computing devices. It is in this layout that most printing systems are setup and in which a majority of the problems described above are realized.

Specifically, FIG. 4 features a traditional print server printing system comprising a client computing device 184 in communication with a print server 206. Client computing device 184 functions much the same way as described in FIG. 3, only that print server 206 is capable of processing multiple print jobs from multiple client computing devices, each of which are in communication with or connected to print server 206, and sending these print jobs to one or more printing devices 234. As described above, a print job is initiated from application 188 (or a background process) and sent to print driver 192. A print job typically comprises print data in the form of raw or EMF data. Once the print job is sent to print driver 192, print driver 192 forwards the information on to spooling device 196. Spooling device 196 subsequently despools the print data to port manager 208. A print processor 200 may optionally employed to process the print job in which case print processor 200 sends EMF data to printer driver 192, and raw data to port manager 208. In each case, all of the necessary print job information is provided to port manager 208. Once received, port manager 208 sends the information out of client computing device 184 to a print queue 212 located on print server 206.

Print server 206 comprises a print driver 220, spooling device 216, and optionally print processor 200 of its own. Unlike the client-based print system described above in FIG. 3, the server-based system handles the processing and printing of the print job. Port manager 204 is also located on print server 206 and serves to direct the print job to the one or more printing devices 234, as appropriate.

Some methods and systems have attempted to solve the problems of network printing through direct peer-to-peer de-spooling of print data from the client to the printing device. In these methods, the print provider on the client opens a connection to the network printer through the use of a particular protocol, such as TCP/IP, Novell Netware, or Apple Talk, and attempts to spool data directly to the printer. However, since the network printer can be shared by a variety of clients, the printer must serialize the spooling and printing of print jobs that arrive simultaneously. Typically, the printer blocks subsequent attempts to de-spool and print a print job while another print job is being printed.

Alternatively, the one print job is de-spooled into firmware memory or onto a disk drive while another print job is being printed. These methods cause the client computer device to consume CPU cycles and/or generate additional network traffic. Furthermore, there is no centralized management of the print jobs and thus no prioritization.

One attempt to reduce the amount of network traffic required in performing network printing operations includes providing an operating system on the client computing device that allows or facilitates journaled data to be de-spooled to the print queue rather than the actual print data. The amount of journaled data is assumed to be less in comparison to the amount of traditional print data. Therefore, the amount of network traffic is reduced. However, this attempt requires a copy of the corresponding printer driver to be located on the print server, further requiring the maintenance and/or licensing of an extra printer driver. Moreover, this attempt does not address the loss of bi-directional communication or the requirement of an additional computer device, the print server. Moreover, the print server consumes additional CPU cycles to render the journal data into printer ready data.

In traditional systems, a user manually selects a printer driver/printer from those available on the client computing device or printing source, and examines the status of the printer from the printer status monitor. For example, within the Microsoft family of Operating Systems, a User generally initiates a print job from an application by pulling down the File Menu and selecting Print, or by selecting a file and choosing the print command option from a list of options available by right clicking on a file or folder. The Print selection subsequently displays a dialog to the User, wherein the dialog contains a pull-down list of available printers installed and accessible from the client computing device or printing source. While allowing some degree of flexibility, this type of limited process and/or approach suffers in that the User must either have prior knowledge of the capabilities of each printer accessible from the client computing device prior to making any final determination or selection of printers, or alternatively, the User must manually select and examine (i.e., enumerate) each printer selection to determine each respective printer's capabilities and print quality. In addition, to determine the status of each printer, or a desired subset of printers, the User must invoke the printer status monitor on each accessible printer. This approach additionally suffers in that the status monitor only provides very limited information, often only the number of print jobs queued or OFFLINE/READY. No other information is relegated to the User, such as the size of each print job queued or reason a printer is OFFLINE, that would or could be advantageous in making a suitable printer selection. Still further, this approach suffers in that the printer driver and status monitor provide no information on the speed (i.e., PPM), or locality (i.e., physical location) of the respective attached printing device(s).

U.S. Pat. No. 6,088,120 to Shibusawa et al., titled "Printer Managing Apparatus, Printer System and Printer Setting Method" (the '120 patent) attempts to solve some of the above-described problems. The '120 patent discloses a virtual printer driver that is the conjunction (AND) or disjunction (OR) of the printer capabilities of a predefined set of printers. However, this approach suffers in that the invention does not take into account the availability or locality of the printers. Moreover, the invention suffers in that it requires the printers to be network printers, and managed by a printer server.

The '120 patent also suffers in that the printer capabilities are predetermined, which, as a result, requires each of the printers to be pre-known to the User prior to choosing a printer and when constructing a Virtual Printer Driver. As such, the User must manually reconstruct the virtual printer driver if any one of the printers' capabilities changes, becomes unavailable, or a printer is added to/deleted from the list. Since the printers have to be pre-known, the User is unable take advantage of any "auto-discovery" techniques to dynamically find or select new and existing printers, or make changes in a printers' capabilities, such as modifying sheet assembly characteristics and/or finishing options, etc.

Still further, the '120 patent also suffers in that the disclosed Virtual Printer Driver cannot take advantage of any Print Assist programs that are, or may be inserted, into the print data flow, such as a custom print processor.

SUMMARY AND OBJECTS OF THE INVENTION

The present invention seeks to solve the apparent problems of prior art printing systems by providing a virtual printer driver adapted and designed to select the best matching print driver/printer/printing device available to a client or printing source for an existing print job. Matching to achieve such a "best fit" is preferably based upon, but not limited to, factors such as the ability of the client computing device to assemble and render the print job, the quality of the output, the availability of one or more printing devices, and the locality of the printing device.

To achieve the foregoing objects, and in accordance with the invention as embodied and broadly described herein, the present invention features a computer-based printing system and a method of initiating a print job within a computer-based printing system.

The computer-based printing system of the present invention comprises, preferably, a client computing device, optionally one or more server computing devices, a virtual printer driver, one or more printer drivers, a print processor, a spooler, and one or more printers. The virtual printer driver allows a user to select the best available printer, as well as or in addition to the best available print features, for printing a print job without manual enumeration as required by prior art printing systems.

The present invention seeks to solve all of the above-identified problems of selecting the "best fit" printer based on printer capabilities, print quality, availability of each attached or accessible printing device, and locality of each attached or accessible printing device. The present invention also seeks to solve all of the above problems of selecting a "best-fit" printer from a single dialog instantiation, providing a virtual printer driver supported within a local, networked, and/or remote printer environments, selecting printers using an auto-discovery technique, and emulation of sheet assembly features not otherwise supported in the printer environment.

Stated positively, the printing system and integrated virtual printer driver of the present invention provides significant advantages over prior art printing systems and is capable of obtaining a "best-fit" between a print job and one or more accessible printers based on either the capabilities of the printer, the quality of the printer, the availability of the printer, the location of the printer, and/or any combination of these. The printing system and integrated virtual printer driver of the present invention further provides advantages such as using only a single dialog selection to carry out the print job, allowing sheet assembly emulation, and being supportable within a local, networked, or remote printing environment.

A standard printer driver is incapable of providing such advantages, although supportable within a local, networked, or remote printing environment. As mentioned above, a User is limited by the capabilities of a standard printer driver as a User is only able to select a printer based on its capabilities and quality by manually doing such. Furthermore, all other advantages provided by the present invention are unavailable to a standard printer driver.

Moreover, even in improved print managing systems, such as that disclosed in the '120 patent, the above-identified advantages are not to be found.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 7, is not intended to limit the scope of the invention, as claimed, but is merely representative of the presently preferred embodiments of the invention.

The presently preferred embodiments of the invention will be best understood by reference to the drawings wherein like parts are designated by like numerals throughout.

The following disclosure of the present invention is grouped into several subheadings. The utilization of the subheadings is for convenience of the reader only and is not to be construed as limiting in any sense.

Exemplary Operating Environment

Figure 1:
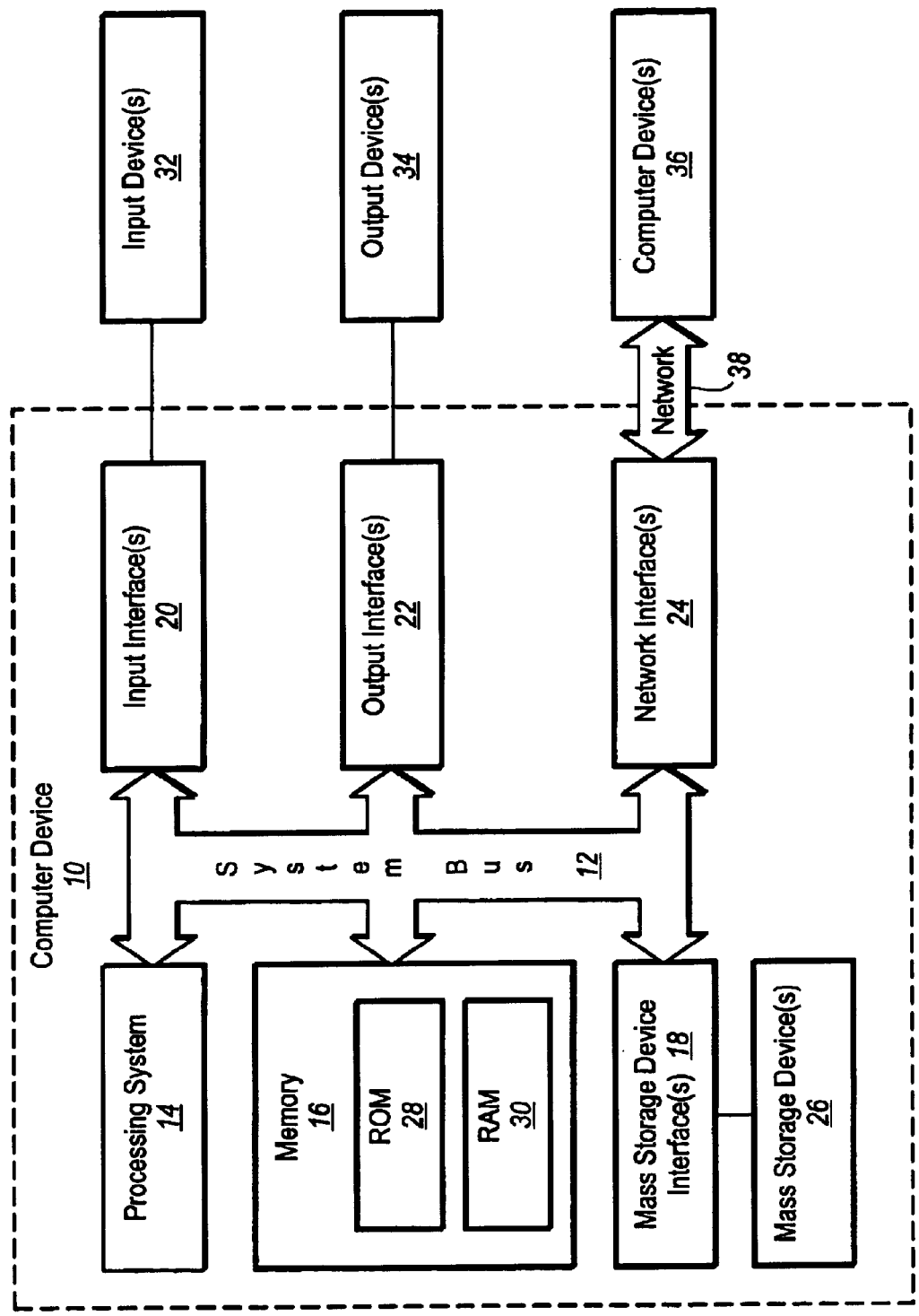
FIG. 1 illustrates, generally, a representative system in which the present invention may be implemented.

FIG. 1 and the corresponding discussion is intended to provide a general description of a suitable operating environment in which the invention may be implemented. One skilled in the art will appreciate that the invention may be practiced by one or more computing devices and in a variety of system configurations, including and preferably within a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electronically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or other suitable interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
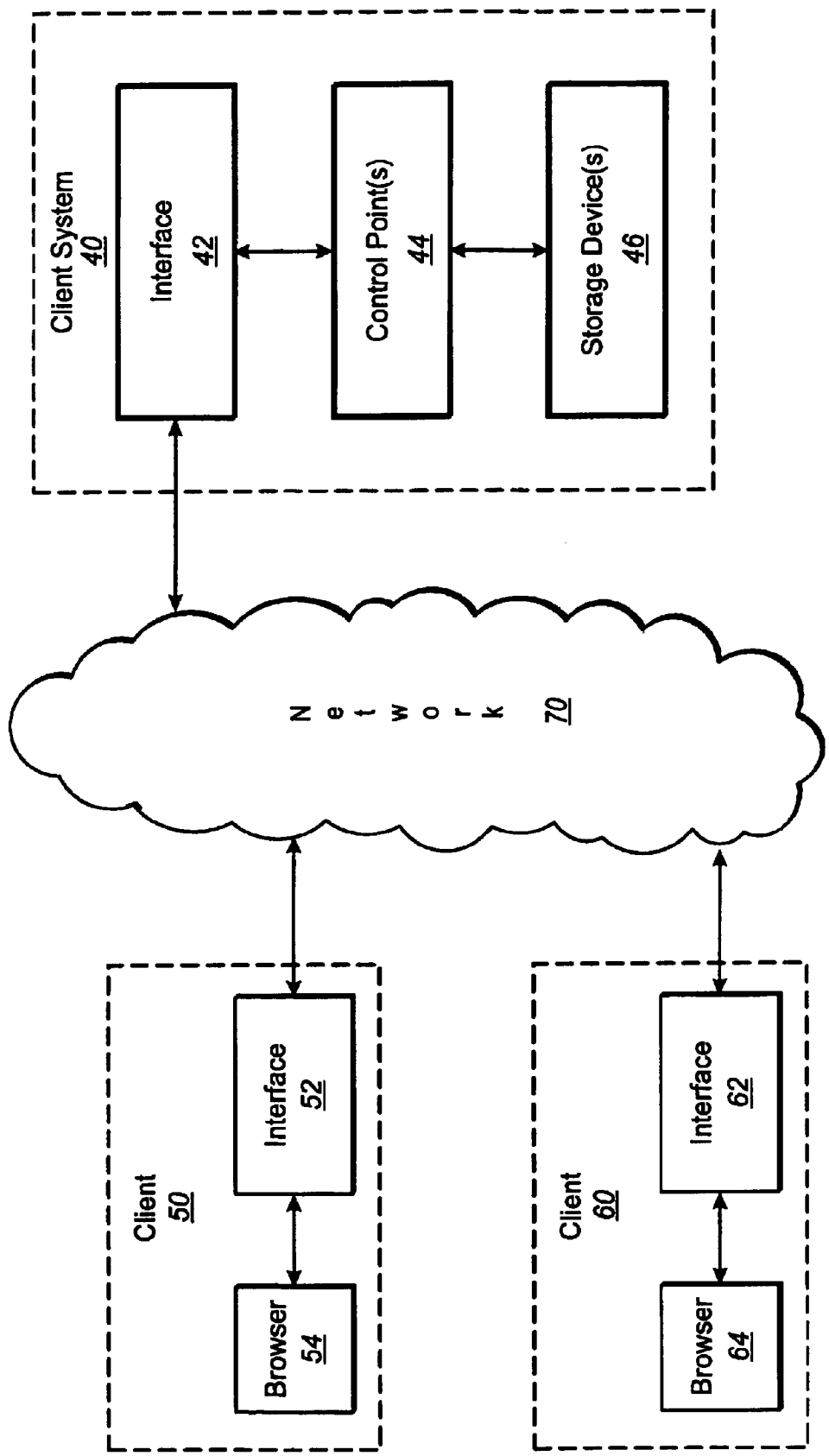
FIG. 2 illustrates, generally, a networked environment that includes clients connected to a server via a network, wherein the networked environment is representative of a system in which the present invention may be implemented.
Figure 3:
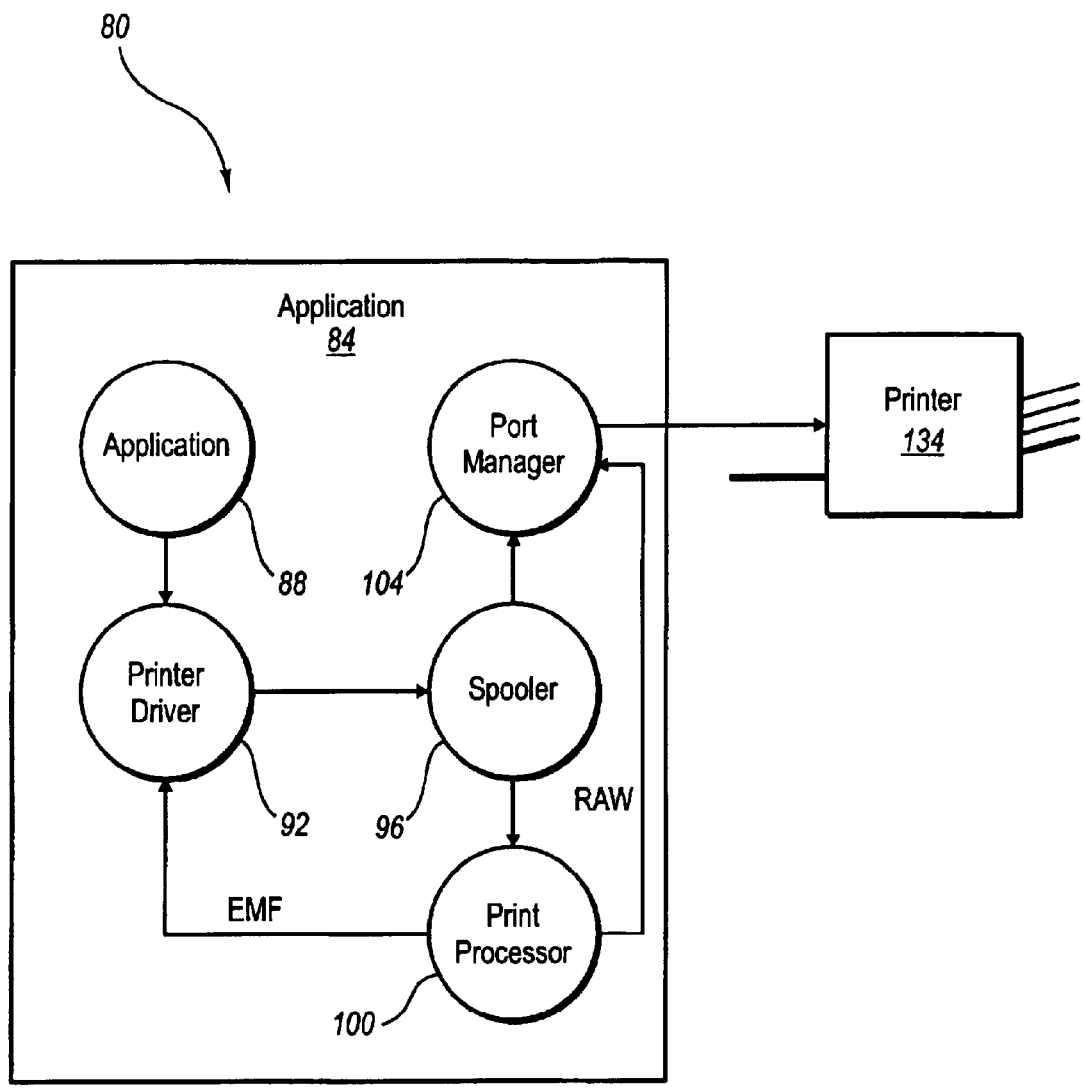
FIG. 3 illustrates a prior art client-based traditional printing system.
Figure 4:
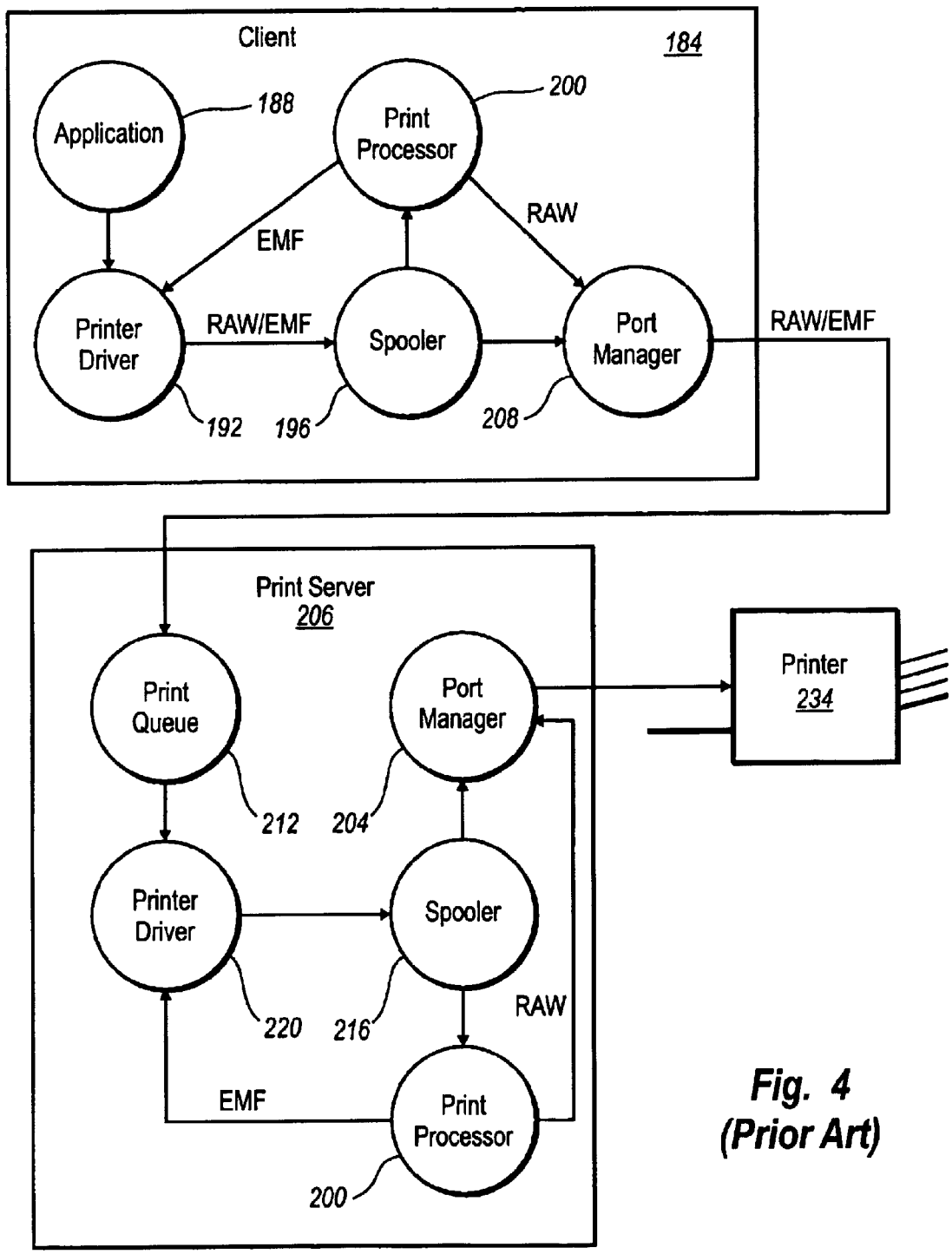
FIG. 4 illustrates a prior art traditional printing system having a print server to manage existing print jobs.

While those skilled in the art will appreciate that the invention may be practiced in networked computing environments with many types of computer system configurations, FIG. 2 represents an embodiment of the present invention in a networked environment that includes one or more clients, such as clients 50 and 60, that are connected to a server 40 via a network 70. Clients 50 and 60 each comprise generally a browser 54 and 64 and a network interface 52 and 62 for interfacing with network 70. Server 40 comprises a network interface 42 of its own, which interfaces with network 70, one or more application servers 44, and a storage device 46.

While FIG. 2 illustrates an embodiment that includes two clients connected to the network, alternative embodiments include one client connected to a network or many clients connected to a network. Moreover, embodiments in accordance with the present invention also include a multitude of clients throughout the world connected to a network, where the network is a wide area network or global network, such as the Internet.

Present Invention Virtual Printer Driver—Best Fit Function

The present invention describes a method and system for providing a computer-based printing system. Specifically, the computer-based printing system comprises 1) a computing device, such as a client computing device or a server computing device, containing print data and capable of initiating a print job and/or despooling print data to a printing device; 2) one or more output devices, or printers, accessible from the computing device, wherein the output devices have one or more corresponding printer drivers in support thereof; 3) means for initiating a print job, such as through an application program or a background process, the means indicating that the print data is to be despooled to one of the output devices, the print job comprising the print data; 4) a virtual printer driver supported by the printing system and called by the means for initiating the print job, wherein the virtual printer driver determines and selects which of the output devices to send the print job, the determination being based upon a best fit analysis between the capabilities of the output device and one or more options and requirements of the print job, without manual enumeration of each of the output devices; and 5) a print control assembly in communication with the computing device, wherein the print control assembly is capable of storing, processing and directing a set of printing instructions as received from the virtual printer driver. The print control assembly may be any one or a combination of the following components—at least one printer driver, a spooling device, a print processor, a port manager, and/or a print server.

The method of initiating or printing a print job according to the present invention comprises: 1) generating print data within a client computing device, wherein the client computing device is connected to and in communication with the computer-based printing system; 2) making accessible to the computer-based printing system one or more output devices, such that the output devices are in communication with the computer-based printing system and the client computing device; 3) calling a virtual printer driver from the client computing device, the virtual printer driver supported on the computer-based printing system and performing the task of processing and sending the print data in a print data stream to one of the output devices for printing according to the method steps comprising a) gathering information on the capabilities, locality, and status of the one or more output devices, including corresponding printer drivers associated with the respective output devices, accessible from the client computing device; b) displaying to the user a dialog of a plurality of options and requirements pertaining to the print job; c) allowing the user to identify and select from the dialog which of the options and requirements are desired for the print job, the information on the capabilities, localities, and status of the one or more output devices and the options and requirements of (e.g., job splitting, pool printing) the print job combining to define a set of printing instructions; d) selecting one or more of the output devices by which the virtual printer driver may direct the print job without requiring manual enumeration of each of the respective plurality of output devices by the client computing device, the step of selecting being based upon and according to a best fit between the capabilities of the output devices and the options and requirements of the print job, the best fit based on one or more identified criteria of the plurality of output devices; e) causing the printing instructions to be communicated and rendered to the corresponding printer drivers of the selected output devices; f) causing the corresponding printer drivers of the selected output devices to write the printing instructions to the corresponding port managers of the selected output devices; and g) printing the print data on the selected output devices according to the printing instructions. Optionally, this method also comprises modifying the print data stream to emulate sheet assembly features.

As mentioned, the computer-based printing system of the present invention comprises one or more output devices. Such an output device may be any known device capable of rendering information, such as a printer, a monitor, a floppy or hard disk, an email recipient, CD burner, etc. These devices may be connected within a local environment, or may be connected within a network, or a peer-to-peer printing environment. The computer-based printing system also comprises one or more client computing devices, and optionally one or more server computing devices, capable of initiating one or more print jobs of one or more documents contained and existing on the client computing device. The computing device is able to despool a print job to a spooler, and/or optionally to a print processor, and subsequently to one or more compatible printers, where, as stated, the computing device has the ability to determine the printer capabilities, print quality, locality (if available), and availability of each accessible printer, without manual enumeration through each respective printer driver and status monitor.

Generally, spooling, an acronym for simultaneous peripheral operations on-line, refers to putting jobs in a buffer, which is a special area in memory or on a disk where a device can access the information stored therein when it is ready. Spooling is useful because devices access data at different rates. The buffer provides a waiting station where data can rest while the slower device catches up. Typically, in print spooling, documents are loaded into the buffer (usually an area on a disk), and then the printer pulls them off the buffer at its own rate. Because the documents are in a buffer where they can be accessed by the printer, you can perform other operations on the computer while the printing takes place in the background. Spooling also lets you place a number of print jobs on a queue instead of waiting for each one to finish before specifying the next one.

Furthermore, a server is a computer or device on a network that manages network resources. In the case of a print server, the print server is a computer that manages one or more printers. Servers are often dedicated, meaning that they perform no other tasks besides their server tasks. On multiprocessing operating systems, however, a single computer can execute several programs at once. A server in this case could refer to the program that is managing resources rather than the entire computer.

Furthermore, a printer driver is a software program that controls a printer. Whenever a document is printed, the printer driver takes over, feeding data to the printer with the correct control commands. Most modem operating systems come with printer drivers for the most common types of printers, but they must be installed before the printer can be used.

In the preferred embodiment, the client computing device (or server) has the ability to ascertain the printer capabilities, the print quality, locality (if available), and availability of each accessible printer in communication with the client computing device(s), or optionally the server(s), without requiring the User to undergo manual enumeration through each respective printer driver and status monitor to determine and select the most appropriate printing device on which to print the print job.

Figure 5:
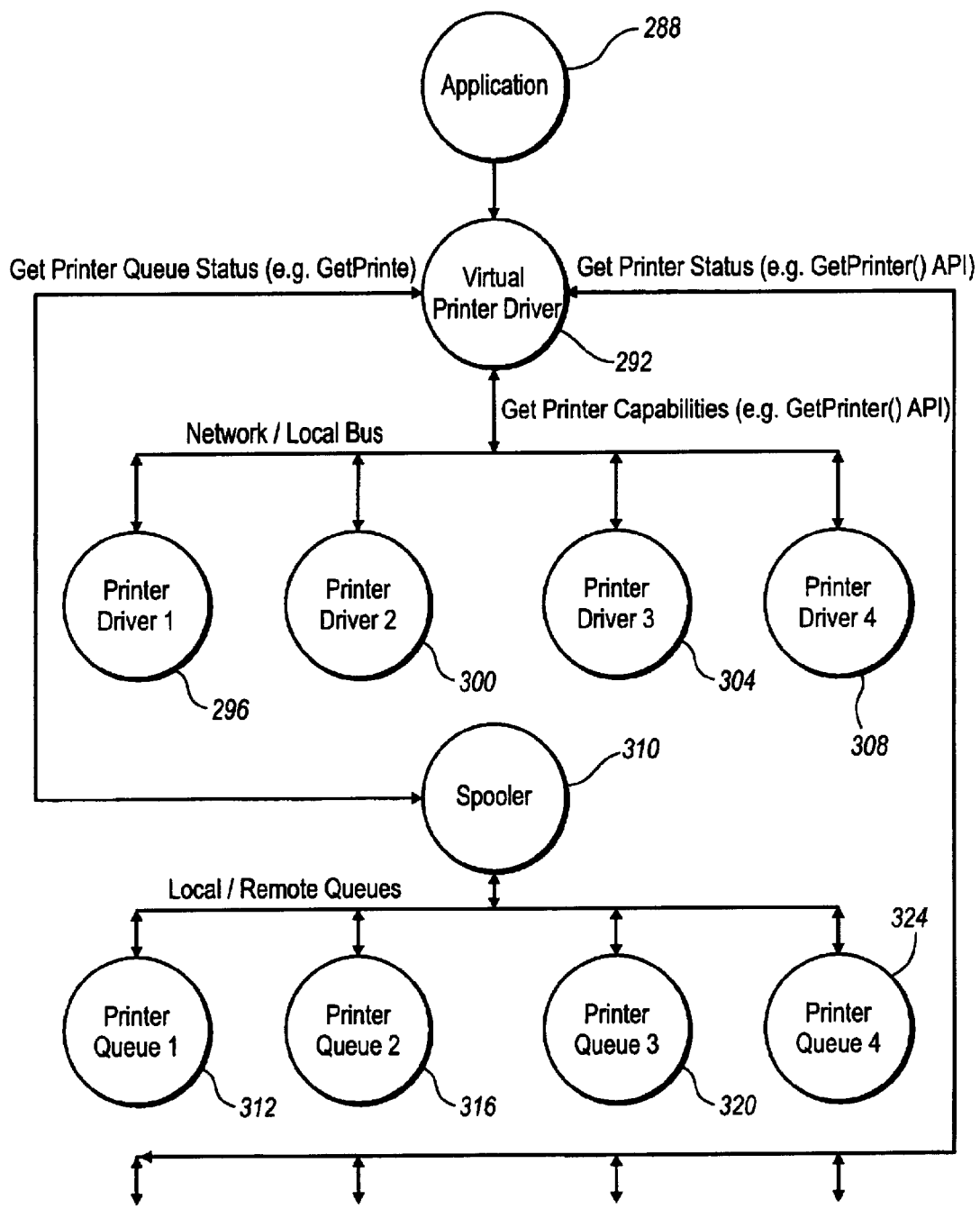
FIG. 5 illustrates the virtual printer driver within a computer-based printing system according to the present invention.
Figure 6:
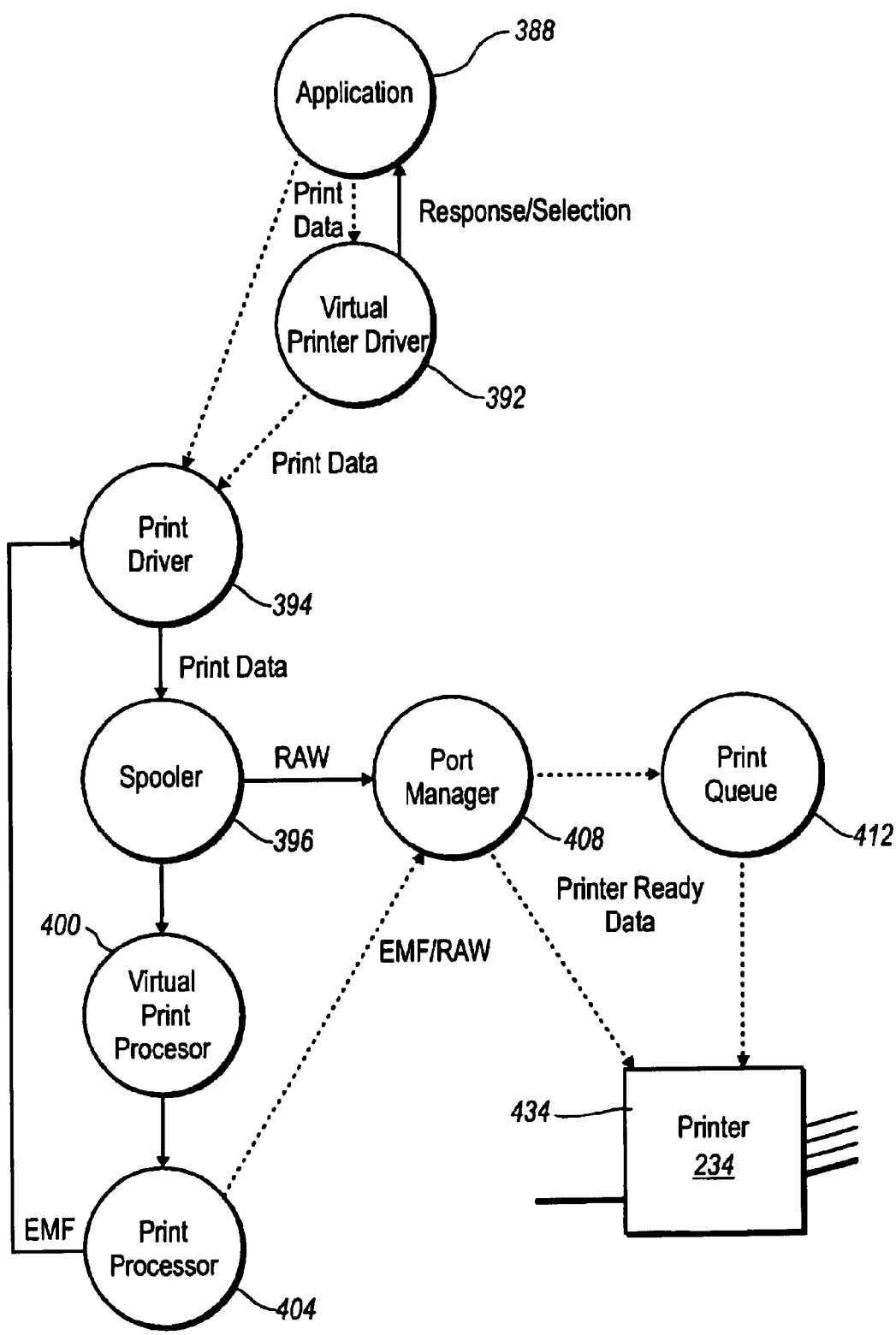
FIG. 6 illustrates the virtual printer driver within an alternative embodiment of a computer-based printing system according to the present invention.

The following discussion refers to FIGS. 5 and 6. From the client computing device (not shown), the User is able to initiate each print job or print jobs. A print job, or print jobs, may comprise one or more documents, all or in part, with each document comprising one or more pages. Additionally, a print job may comprise a collective assembly of one or more copies of a document. Typically, a print job is initiated from an application 288, or by an automated or background process. In each case, upon initiation of the print job(s), the User selects a command, or sequence of commands, and/or stimulus to the client computing device, indicating that the user intends to despool the print data, through spooler 310, to one or more printing device(s) 434.

As shown in FIG. 5, the traditional or prior art step of the User selecting a predetermined printer driver, is replaced with the User selecting a virtual printer driver 292. Upon invocation, virtual printer driver 292 displays a dialog(s) to the User, wherein the User is able to specify several options and/or requirements that are to be associated with the print job. These several options and/or requirements are those typically found in other printer drivers and print systems, and may include, but are not limited to, collation, sheet assembly, finishing requirements, image processing requirements, job printing, print pooling, and intelligent routing instructions.

Collation refers to or is associated with requirements or options such as the number of copies of the print job, any groups or sets that are to be employed, whether the printed sheets are to be returned face up or face down, and whether a cover sheet or a job separator is to be included with the printed material.

Sheet assembly refers to or is associated with how the printed material will appear and what form it will take. These options and/or requirements are closely related to collation and comprise, among others, duplex, n-up, booklet form, tablet form, printclub, reverse order, orientation on the paper, and paper size.

Finishing aspects of the print job may include, among others, such things as stapling, three-hole punching, saddle stitching, insertion of a transparent sheet, and mail trays.

Image processing aspects may include, among others, such things as whether the print job is to appear in the negative, whether there are any watermarks present that are to be included, the print quality, DPI, color matching, error diffusion, and half toning.

Job splitting aspects may include, among others, copy splitting, and document splitting.

Printer pooling aspects include first available, minimum load, and other similar pooling capabilities.

Intelligent routing aspects may include, among others, finishing capabilities of a printing device, physical proximity of the printing device to the client computing device, minimum time to complete the print job, and the quality of the print available from the printing device.

Once the User has specified and selected the desired option(s) and/or requirements of the print job(s), virtual printer driver 292 gathers information on the capabilities, locality (if available), and status of each printing device 434 accessible from the client computing device by polling each of these printing devices. The information sought by virtual print driver 292 may be any type of information relevant to a print job and a printing session, and will most likely include, but is not limited to, printer driver capabilities, printer firmware capabilities, printer finishing capabilities, printer queue(s) status, printer status, and printer location. In an alternate embodiment, the virtual printer driver may query another device or application that performs the polling and gathering of status/capabilities on behalf of the virtual driver.

Printer driver capabilities include, but are not limited to, collation, sheet assembly, DPI resolution, print quality, and error diffusion/half toning.

Printer firmware capabilities include, but are not limited to, PDL Interpreters (e.g., PCL, Postscript, PDF), duplex, color, face up, sheet assembly, printable area, and PPM (pages per minute).

Printer finishing capabilities include, but are not limited to, 3 hole punch, stapling, saddle stitch, and mail trays.

Printer queue(s) status includes, but is not limited to, local, network, and/or remote print queues (printer firmware).

Printer status includes, but is not limited to, no connection, offline, cool, warming up, ready to print, busy, and error state (e.g., paper jam, out of toner).

Printer locality included the physical location of the several printing devices accessible from the client computing device.

Printing devices and/or printer drivers that are accessible from the client computing device(s) comprise printing devices and/or printer drivers that are either preinstalled on the client computing device, downloadable from a preknown print server, or discovered on a local, network (LAN), or remote (WAN) connected network, through an auto-discovery technique. The auto-discovery technique is described in greater detail below in the discussion of FIG. 7.

In operation, or once activated, virtual printer driver 292 gathers the above-described information by querying each printer driver(s), shown as 296, 300, 304, and 308, respectively, and corresponding print queue(s), shown as 312, 316, 320, and 324, respectively, and printing device(s) (not shown). For example, in the Microsoft family of operating systems, the virtual printer driver would generally obtain information from the printer driver and local/or network print queue using a Spooler API call, such as GetPrinter( ). Information pertaining to the printing device's capabilities and/or state can be obtained via proprietary or industry standard protocols, such as SNMP, IPP, HTTP, SSDP, UPnP. One ordinarily skilled in the art will recognize the many possible ways in which such information may be specifically obtained, as this process is common and well known in the art.

In addition, virtual printer driver 292 queries any document processing, image processing, and/or sheet assembly print assist components, such as a custom print processor, that are, or may be, inserted into the print data stream. For example, the virtual printer driver may query a page independent spool file sheet assembly, such as the one designed by Sharp Laboratories of America, Inc., which discloses a custom print processor that is able to emulate various sheet assembly print capabilities, including N-up, booklet, collation and reverse order.

In an alternate embodiment of the present invention, virtual printer driver 292 would gather the above-described information prior to the User selecting the options and/or requirements of the print job(s) from all accessible printing devices and/or print drivers. Virtual printer driver 292 would then only display, or cause to be displayed, and allow to be selected, those options that are supportable by at least one printing device accessible from the client computing device.

After initiation of the print job, and once the User's options and/or requirements for the print job(s), as well as the capabilities and status of the accessible printing device(s) and printer driver(s) is known as previously discussed, virtual printer driver 292 proceeds to select one or more printing devices 434 that are a "best-fit" with the respective print job. In the case of cluster printing (i.e., pool printing or job splitting), the virtual printer driver may select one or more groups of printing devices, each forming a single logical printing device. The selection may be automatic or interactive with the User.

Any algorithm for attaining a "best-fit" may be used. Popular algorithms include those such as first available printer, fastest to complete printer, highest output resolution, proximity to client, etc. Of course, the type of algorithm used will depend upon the needs and requirements of the print job, and the availability and capabilities of the printing device to which the print job will be sent.

If more than one printing device or group of printing devices is selected, the virtual printer driver will either automatically select a single printing device or group from the larger set, using an algorithm such as a resolution algorithm, or the User will interactively select a single printing device or group from the larger set.

The following describes the process of seeing through the print job to actual printing once a printing device is determined to be and selected as the "best-fit" printing device by the virtual printer driver. As shown in FIG. 6, once a single printing device or group of printing devices is selected, the virtual printer driver then switches the device context to the corresponding printer driver(s), shown generally as 394. The application, or background process, then writes the printing instructions to the printer driver(s) 394. Printer driver(s) 394 then spool the print data to Spooler 396. Spooler 396 then despools the print data to print processor 404. If the print data is printer ready data (i.e., raw), the print processor writes the printer ready data directly to port manager(s) 408 of the associated printing device(s) 434. If the print data is journaled data (e.g. EMF), print processor 404 will either playback the journaled data to printer driver(s) 394 on the client computing device, or despool the journaled data to a print server, not shown, for deferred rendering. Once printer driver(s) 394 render the print data, the printer ready data is then written directly to port manager(s) 408 of associated printing device(s) 434 which in turn, cause the print job to be printed. Optionally, printer driver(s) 394 would spool the print data to the spooler 408, which would process the print data and then despool the data directly to port manager 408.

While this represents one way of seeing through the print job to printing, one ordinarily skilled in the art will recognize other possible ways in which to perform the steps just described. For example, in an alternate embodiment, virtual printer driver 392 would not change the device context.

Instead, the printing instructions would be written to virtual printer driver 392 itself, which would in turn playback the instructions to the selected printer driver(s) 394. Such is an example of a pass-thru device and could be implemented into the computer-based printing system of the present invention.

Figure 7:
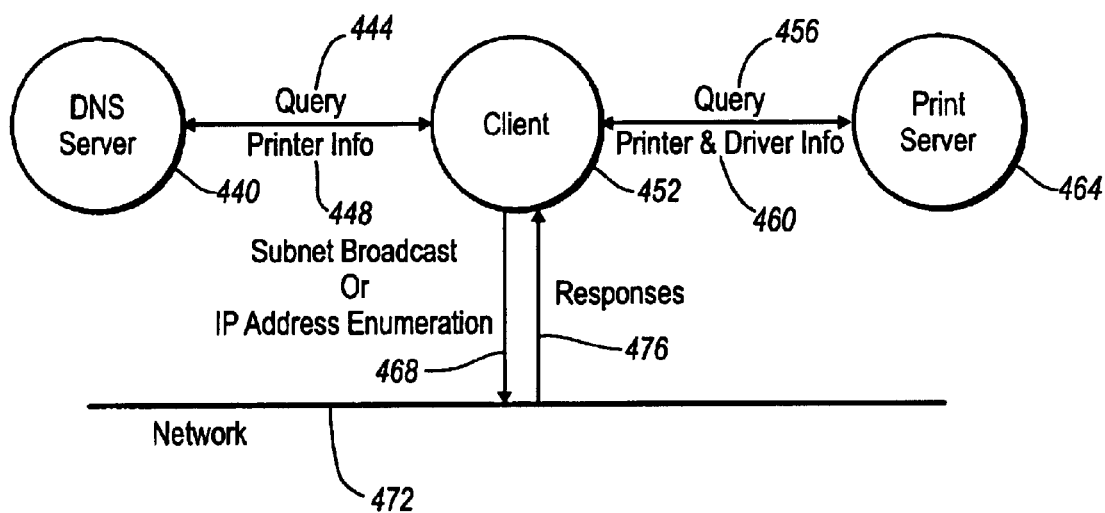
FIG. 7 illustrates one possible auto-discovery technique according to the present invention.

FIG. 7 illustrates the auto-discovery technique of the present invention used to discover, automatically, any printers and/or print drivers that are accessible from the client computing device, along with their associated capabilities information. As shown, client computing device 452 may communicate with network 472 to send subnet broadcast or IP address enumeration 468 information, and in turn, receive responses 476 from these as to their capabilities, accessibility, etc. Client computing device 452 further communicates with DNS server 440 and/or print server 464 much the same way as previously described. Rather than manually selecting print job restrictions, the virtual printer driver of the present invention automatically extracts the information and capabilities of these components through the auto-discovery technique. It should be noted that these are only examples, and are not meant to be limiting of the auto-discovery process.

While the discussion above relates to the use of a Microsoft® operating system, other embodiments of the present invention embrace the use of other operating systems, such as an Apple Macintosh® operating system, a Linux® operating system, a System V Unix® operating system, a BSD Unix® operating system, an OSF Unix® operating system, an IBM® Mainframe MVS operating system, and/or another operating system.

The present invention also features a computer program product comprising a virtual printer driver within a computer-based printing system. The virtual printer driver comprises code that directs a computer to 1) initiate a print job from a computing device as directed by a user, wherein the print job comprises print data; 2) gather information on the capabilities, locality (if available), and status of one or more output devices accessible from the computing device, wherein the output devices include corresponding printer drivers; 3) display to the user a dialog of a plurality of options and requirements pertaining to the print job; 4) allow the user to identify and select from the dialog which options and requirements are desired for the print job, wherein the information on the capabilities and status of the one or more output devices and options and requirements of the print job combine to define a set of printing instructions; 5) select one or more of the output devices by which the virtual printer driver may direct the print job, the step of selecting being based upon and according to a best fit between the capabilities of the output devices and the options and requirements of the print job, the best fit based on one or more identified criteria of the plurality of output devices, without manual enumeration of each respective plurality of output devices by the client computing device; 6) render the printing instructions to the corresponding printer drivers of the selected output devices; and 7) print the print data on the selected output devices according to the printing instructions.

The present invention further features a computer system for matching the best available printer with an outstanding print job, the system comprising: 1) a gathering component that gathers information pertaining to the capabilities and status of each of one or more output devices accessible to a computing device; 2) a dialog component that displays, and wherein a user may select, any requirements and options pertaining to the print job, the information pertaining to the capabilities and status of the output devices and the options and requirements pertaining to the print job combining to define a set of printing instructions; 3) a selection component that selects one or more of the output devices to print the print job, the selection component basing the selection upon a best fit between the requirements and options of the print job and the capabilities and status of the output devices; and 4) a rendering component for rendering the printing instructions to the selected output devices, wherein the print job is printed.

Finally, the present invention features a computer readable medium containing a data structure for storing the capabilities and status of one or more output devices accessible to a computing device to be used in conjunction with requirements and options of a print job, based upon a best fit of such, to determine which of the computing devices is to be used to print the print job without manual enumeration of each of the output devices.

The present invention may be embodied in other specific forms without departing from its spirit of essential characteristics. The described embodiments are to be considered in all respects only illustrative and not restrictive. The scope of the invention is, therefore, indicated by the appended claims, rather than by the foregoing description. In addition, it is intended that all changes which come within the meaning and range of equivalency of the claims are to be embraced within their scope.

What is claimed is:

1. A computer-based printing system comprising:
   a computer device;
   one or more output devices accessible from said computer device for rendering a print job, said output devices having one or more corresponding printer drivers in support thereof;
   means for initiating said print job, said means indicating that said print data is to be despooled to one or more of said output devices, said print job comprising print data;
   a virtual printer driver supported by said printing system and called by said means for initiating said print job, wherein said virtual printer driver determines and selects which of said output devices to send at least a portion of said print job for rendering, said determination based upon a best fit analysis between said output devices and one or more options and requirements of said print job, without manual enumeration of each of said output devices; and
   a print control assembly in communication with said computer device, said print control assembly capable of storing, processing and directing a set of printing instructions as received from said virtual printer driver by said virtual printer driver switching a device context to corresponding printer drivers of said selected output devices, an application or background process writing said printing instructions to said corresponding printer drivers, which spool said print data to a spooler that despools said print data to a port manager or a print processor.

2. The printing system of claim 1, wherein said printing system comprises a networked environment.

3. The printing system of claim 1, wherein said printing system comprises a peer-peer environment.

4. The printing system of claim 1, wherein said printing system comprises a local environment, wherein said computer device is directly coupled to said output devices.

5. The printing system of claim 1, wherein said virtual printer driver is supported on said computer device.

6. The printing system of claim 1, wherein said computer device is a client.

7. The printing system of claim 1, wherein said computer device is a server.

8. The printing system of claim 1, wherein said computer device is capable of determining the capabilities, status, and locality of said output devices without manual enumeration through each respective printer driver and status monitor.

9. The printing system of claim 1, wherein said print job is initiated from within an application program.

10. The printing system of claim 1, wherein said print job is initiated from a background process.

11. The printing system of claim 1, wherein said print job is initiated automatically by an automated process.

12. The printing system of claim 1, wherein said virtual printer driver comprises and displays a dialog comprising selectable options and requirements that a user may specify for said print job.

13. The printing system of claim 12, wherein said dialog comprises selectable options and requirements that are selected from the group consisting of collation, sheet assembly, finishing characteristics, image processing, job splitting, printer pooling, and intelligent routing.

14. The printing system of claim 1, wherein said virtual printer driver ascertains the capabilities, locality, if any, and status of each of said output devices accessible from said computer device and displays such to said user.

15. The printing system of claim 14, wherein said virtual printer driver ascertains said capabilities, locality, if any, and status of each of said output devices prior to said displaying said capabilities and status designations to said user, such that said user may select only those features that are available on at least one of said output devices.

16. The printing system of claim 14, wherein said output devices comprise capabilities, locality, if any, and status designations selected from the group consisting of printer driver capabilities, printer firmware capabilities, printer finishing capabilities, printer queue status, printer status, and printer locality.

17. The printing system of claim 1, wherein said accessibility of said output devices and said corresponding printer drivers is determined from said output devices and said corresponding printer drivers being pre-installed on said computer device.

18. The printing system of claim 1, wherein said accessibility of said output devices and corresponding printer drivers is determined from said output devices and said corresponding printer drivers being downloadable from a print server.

19. The printing system of claim 1, wherein said accessibility of said output devices and corresponding printer drivers is determined from said output devices and said corresponding printer drivers being discoverable using an auto-discovery program.

20. The printing system of claim 1, wherein said virtual printer driver queries print assist components to be incorporated into said print job.

21. The printing system of claim 1, wherein said virtual printer driver selects one or more groups of said output devices in the case of cluster printing, wherein said group comprises a single logical output device, said selection based upon an identified best fit algorithm.

22. The printing system of claim 1, wherein a user interactively selects said output device to print said print job.

23. The printing system of claim 1, wherein said printing instructions are written to said print control assembly by said computer device upon a device context being switched to said selected output device at the direction of said virtual printer driver.

24. The printing system of claim 1, wherein said printing instructions are written to said virtual printer driver, said virtual printer driver subsequently plays back said printing instructions to said print control assembly.

25. The printing system of claim 1, wherein said printing instructions comprise said print data, information on said capabilities, locality, and status of said output devices, and said requirements and options of said print job.

26. The printing system of claim 1, wherein said print control assembly comprises components selected from the group consisting of at least one printer driver, a spooling device, a print processor, a port manager, and a print server.

27. The printing system of claim 1, wherein said print control assembly is contained within and supported by said output device.

28. A method of initiating a print job within a computer-based printing system, said method comprising the steps of:

generating print data within a client computer device, said client computer device connected to and in communication with said computer-based printing system;

making accessible to said computer-based printing system one or more output devices, such that said output devices are in communication with said computer-based printing system and said client computer device;

calling a virtual printer driver from said client computer device, said virtual printer driver supported on said computer-based printing system and performing the task of processing and sending said print data in a print data stream to one of said output devices for printing according to the method steps comprising:

gathering information on the capabilities, locality, if any, and status of said one or more output devices, including corresponding printer drivers associated with said respective output devices, accessible from said client computer device;

displaying to said user a dialog of a plurality of options and requirements pertaining to said print job;

allowing said user to identify and select from said dialog which of said options and requirements are desired for said print job, said information on the capabilities, locality, and status of said one or more output devices and said options and requirements of said print job combining to define a set of printing instructions;

selecting one or more of said output devices by which said virtual printer driver may direct said print job, said step of selecting being based upon and according to a best fit between said capabilities and status of said output devices and said options and requirements of said print job, said best fit based on one or more identified criteria of said plurality of output devices, without manual enumeration of each respective said plurality of output devices by said client computer device;

causing said printing instructions to be communicated and rendered to the corresponding printer drivers of said selected output devices by said virtual printer driver switching a device context to said corresponding printer drivers of said selected output devices, wherein an application or background process containing said print data writes said printing instructions to said corresponding printer drivers, said corresponding printer drivers then spool said print data to a spooler, which then despools said print data to a port manager or a print processor;

causing said corresponding printer drivers of said selected output devices to write said printing instructions to the corresponding port managers of said selected output devices; and printing said print data on said selected output devices according to said printing instructions.

29. The method of claim 28, wherein said step of gathering information further comprises the step of:
   querying a printer driver and corresponding print queue in each of said plurality of output devices.

30. The method of claim 28, wherein said step of calling a virtual printer driver that performs the task of processing and sending said print data in a print data stream to one of said output devices for printing further comprises the step of:
   querying a print assist component selected from the group consisting of a document processing assembly, an image processing assembly, and a sheet assembly;
   inserting said print assist component into said print data stream.

31. The method of claim 28, wherein said step of selecting one or more of said output devices comprises selecting one or more groups of said output devices in the case of cluster printing.

32. The method of claim 28, wherein said step of selecting one or more of said output devices is automatically carried out by said virtual printer driver.

33. The method of claim 28, wherein said step of selecting one or more of said output devices is carried out through an interactive approach with said user.

34. The method of claim 28, wherein said step of selecting comprises automatically selecting a single printing device or group from the larger set, using an identified algorithm, if more than one printing device or group of printing devices are selected by said virtual printer driver.

35. The method of claim 34, wherein said identified algorithm is selected from the group consisting of highest output resolution, first available printer, closest in proximity, and fastest to complete.

36. The method of claim 28, wherein said step of selecting comprises said user interactively selecting a single printing device or group if more than one printing device or group of printing devices are selected by said virtual printer driver.

37. The method of claim 28, wherein said print processor writes said print data directly to a port manager of said selected output devices if said print data is printer ready.

38. The method of claim 28, wherein said print processor plays back said print data to said printer drivers on said client computer device if said print data is journaled print data.

39. The method of claim 28, wherein said print processor despools said print data to a print server for deferred rendering if said print data is journaled print data.

40. The method of claim 28, wherein said step of gathering information on the capabilities, locality, and status of said one or more output devices, including corresponding printer drivers associated with said respective output devices, accessible from said client computer device causes to be limited what is displayed to said user in said dialog by only allowing said dialog to display, and said user to select, those said options and requirements that are supportable by at least one of said output devices as determined by said virtual printer driver in said step of gathering information.

41. A method for initiating a print job within a computer-based printing system, said method comprising:
   generating print data at a computer device, which is capable of communicating with one or more output devices;
   using a virtual printer driver to process and send said print data to one or more of said output devices for printing according to the method steps comprising:
      gathering information relating to said one or more output devices, including corresponding printer drivers associated with said respective output devices;
      displaying to said user a dialog of a plurality of options and requirements pertaining to said print job;
      allowing said user to identify and select from said dialog which of said options and requirements are desired for said print job, said information on the capabilities, locality, and status of said one or more output devices and said options and requirements of said print job combining to define a set of printing instructions;
      selecting one or more of said output devices by which said virtual printer driver may direct said print job, said step of selecting being based upon and according to a best fit between said capabilities and status of said output devices and said options and requirements of said print job, said best fit based on one or more identified criteria of said plurality of output devices, without manual enumeration of each respective said plurality of output devices by said client computer device;
      causing said printing instructions to be communicated and rendered to the corresponding printer drivers of said selected output devices by said virtual printer driver switching a device context to said corresponding printer drivers of said selected output devices, wherein an application or background process containing said print data writes said printing instructions to said corresponding printer drivers, and wherein one of:
      (i) said corresponding printer drivers spool said print data to a spooler, which despools said print data to a port manager or a print processor; and
      (ii) said virtual printer driver plays back said printing instructions to said corresponding printer drivers of said selected output devices;
      causing said corresponding printer drivers of said selected output devices to write said printing instructions to the corresponding port managers of said selected output devices; and
      printing said print data on said selected output devices according to said printing instructions.

42. A computer program product for implementing within a computer system a method for using a virtual printer driver to process and send print data to one or more of output devices for rendering a print job within a computer-based printing system, the computer program product comprising:
   a computer readable medium for providing computer program code means utilized to implement the method, wherein the computer program code means is comprised of executable code for implementing the steps for:
      gathering information relating to said one or more output devices, including corresponding printer drivers associated with said respective output devices;
      displaying to said user a dialog of a plurality of options and requirements pertaining to said print job;
      allowing said user to identify and select from said dialog which of said options and requirements are desired for said print job, said information on the capabilities, locality, and status of said one or more output devices and said options and requirements of said print job combining to define a set of printing instructions;
      selecting one or more of said output devices by which said virtual printer driver may direct said print job, said step of selecting being based upon and according to a best fit between said capabilities and status of said output devices and said options and requirements of said print job, said best fit based on one or more identified criteria of said plurality of output devices, without manual enumeration of each respective said plurality of output devices by said client computer device;

causing said printing instructions to be communicated and rendered to the corresponding printer drivers of said selected output devices by said virtual printer driver switching a device context to said corresponding printer drivers of said selected output devices, wherein an application or background process containing said print data writes said printing instructions to said corresponding printer drivers, and wherein one of:

(i) said corresponding printer drivers spool said print data to a spooler, which despools said print data to a port manager or a print processor; and (ii) said virtual printer driver plays back said printing instructions to said corresponding printer drivers of said selected output devices;

causing said corresponding printer drivers of said selected output devices to write said printing instructions to the corresponding port managers of said selected output devices; and printing said print data on said selected output devices according to said printing instructions.

43. A method for using a virtual printer driver to render a print job, the method comprising:

receiving input that identifies requirements of an initiated print job;

using a virtual printer driver to query printer devices for one or more capabilities;

using the virtual printer driver to select one or more of the printer devices to render the print job based on matching the requirements with the capabilities;

using the virtual printer device to switch a device context to corresponding printer drivers of the selected printer devices; and transmitting the print job to the selected printer devices for rendering the print job.

44. A method as recited in claim 43, wherein the capabilities comprise at least one of: (i) printer driver capabilities; (ii) printer firmware capabilities; (iii) printer finishing capabilities; (iv) printer queue status; (v) printer status; and (vi) printer locality.

45. A method as recited in claim 43, wherein the requirements of the print job comprise at least one of: (i) collation; (ii) sheet assembly; (iii) finishing; (iv) image processing; (v) split printing; (vi) printer pooling; and (vii) intelligent routing.

* * * * *